US008357052B2

(12) United States Patent
Weckerling et al.

(10) Patent No.: US 8,357,052 B2
(45) Date of Patent: Jan. 22, 2013

(54) TRIPOD JOINT AND ROLLER BODY FOR A TRIPOD JOINT (75) Inventors: Thomas Weckerling, Bonn (DE); Wolfgang Manfred Beigang, Neunkirchen-Seelscheid (DE)

(73) Assignee: GKN Driveline International GmbH, Lohmar (DE)

( * ) Notice: Subject to any disclaimer, the term of this patent is extended or adjusted under 35 U.S.C. 154(b) by 122 days.

(21) Appl. No.: 12/739,121

(22) PCT Filed: Oct. 23, 2007

(86) PCT No.: PCT/EP2007/061326
§ 371 (c)(1),
(2), (4) Date: Apr. 21, 2010

(87) PCT Pub. No.: WO2009/052857
PCT Pub. Date: Apr. 30, 2009

(65) Prior Publication Data
US 2010/0310307 A1 Dec. 9, 2010

(51) Int. Cl.
*F16D 3/205* (2006.01)
(52) U.S. Cl. .......................... 464/111; 464/905
(58) Field of Classification Search .................. 464/111, 464/123, 124, 132, 905
See application file for complete search history.

(56) References Cited

U.S. PATENT DOCUMENTS

| | | | |
|---|---|---|---|
| 3,490,251 A | | 1/1970 | Roethlisberger |
| 4,747,803 A | * | 5/1988 | Kimata et al. ................. 464/111 |
| 4,955,847 A | * | 9/1990 | Orain ............................ 464/111 |
| 5,160,298 A | * | 11/1992 | Schneider ..................... 464/111 |
| 5,199,925 A | * | 4/1993 | Welschof ...................... 464/111 |
| 5,254,038 A | * | 10/1993 | Schneider ..................... 464/111 |
| 5,348,512 A | | 9/1994 | Hodge |
| 5,417,612 A | * | 5/1995 | Ide ................................ 464/120 |
| 6,165,075 A | * | 12/2000 | Kita et al. ..................... 464/111 |
| 6,699,134 B2 | * | 3/2004 | Sams et al. ................... 464/111 |
| 7,874,924 B2 | * | 1/2011 | Cho et al. ..................... 464/111 |
| 2006/0205521 A1 | * | 9/2006 | Yoon ............................. 464/111 |
| 2006/0240896 A1 | * | 10/2006 | Ohashi et al. ................ 464/158 |

FOREIGN PATENT DOCUMENTS

| | | |
|---|---|---|
| DE | 100 32 065 A1 | 1/2002 |
| GB | 2226102 A | 6/1990 |
| JP | 03172622 A * | 7/1991 |
| JP | 05172152 A * | 7/1993 |

OTHER PUBLICATIONS

PCT International Search Report dated Jul. 22, 2008 for PCT/EP2007/061326.

* cited by examiner

*Primary Examiner* — Joshua Kennedy
(74) *Attorney, Agent, or Firm* — Rader, Fishman & Grauer, PLLC (57) ABSTRACT

A tripod joint is disclosed which has an outer joint part and an inner joint part. The outer joint part includes a first longitudinal axis and a longitudinally running cavity with an open end. Three longitudinally running recesses are formed in the outer joint part. The inner joint part includes a second longitudinal axis and comprising at least one central body on which are integrally formed three journals with journal axes which extend radially from the second longitudinal axis. In each case, one roller body is arranged on the journals, which roller body has at least one outer ring, a closed inner ring and bearing bodies which are arranged in between. Each roller body is additionally, in each case, held in the recesses in a longitudinally moveable manner, and a rotation of the closed inner ring about the respective journal is blocked. Also proposed is a roller body with a non-circular or angular inner ring.

7 Claims, 9 Drawing Sheets

TRIPOD JOINT AND ROLLER BODY FOR A TRIPOD JOINT

CROSS REFERENCE TO RELATED APPLICATIONS

This application is a National Phase of International Application No. PCT/EP2007/061326, filed on Oct. 23, 2007, which application is hereby incorporated by reference in its entirety.

TECHNICAL FIELD

The present invention relates to a tripod joint having an outer joint part and an inner joint part with a central body which has three integrally formed journals. In each case, one roller body is arranged on the journals. The invention additionally relates to a roller body for a tripod joint.

BACKGROUND

Tripod joints are known from DE-A1-100 32 065, for example. According to the DE-A1-100 32 065 reference, such journals of the tripod joint have, in each case, two end faces, which are situated opposite one another in the axial direction of the joint, in the form of spherical sections and sliding faces, which are situated opposite one another in the peripheral direction, in order to obtain a low contact pressure during the transmission of torque via the journals. Here, it is likewise proposed that the bearing needles of the roller body which is formed at the outside around the journal are guided radially at the inside, on the one hand, on the end faces of the journal in the form of spherical sections, and on the other hand, on disc segments which are situated opposite the sliding faces in the peripheral direction. Here, the disc segments have outer running faces which are designed as cylinder lateral surfaces, so that the bearing bodies can roll in each case on a peripheral face, which is composed of the end faces of the journal and the outer faces of the disc segment, and on the inner face of an outer ring of the roller body. Here, the inner running face of the bearing needles is therefore realized with three components, specifically with the journal and the two disc segments. Accordingly, the bearing needles must, in operation, roll over the joints between the disc segments and journals, which can result in non-smooth running of the bearing needles.

SUMMARY

The present invention provides a joint and a roller body of for a tripod type joint with the option of a load-oriented design. In addition, the joint should be suitable for large deflection angles between the outer joint part and the inner joint part, and in particular for use for the transmission of torque in motor vehicles.

Such a tripod joint is proposed as per the features of patent Claim 1. A roller body is also proposed as per patent Claim 7. Further advantageous embodiments of the devices are specified in the dependent patent claims. It is to be pointed out that the features listed individually in the dependent patent claims can be combined with one another in any desired technologically expedient way and define further embodiments of the invention. In addition, the features specified in the patent claims are specified more precisely and explained in more detail in the description, with further preferred embodiments of the invention being illustrated.

In the present disclosure, a tripod joint is described. The tripod joint has an outer joint part and an inner joint part. The outer joint part is configured with a first longitudinal axis and a longitudinally running cavity with an open end, with three longitudinally running recesses being formed in the outer joint part. The inner joint part is configured with a second longitudinal axis, comprising at least one central body on which there are integrally formed three journals with journal axes which extend radially from the second longitudinal axis. In each case, one roller body is arranged on the journals. The roller body has at least one outer ring, a closed inner ring and bearing bodies which are arranged in between, and each roller body is additionally held in the recesses in a longitudinally moveable manner. A rotation of the closed inner ring about the respective journal is prevented.

In one embodiment, the specified roller bodies are constructed substantially as is known from cylinder roller bearings, with the shape of the outer ring being adapted to the shape of the recess in the outer joint part in which the roller body moves substantially axially. Here, the bearing bodies between the outer ring and inner ring of the roller body are cylindrical or needle-shaped, so that forces or torques from the outer joint part to the inner joint part can be transmitted, in each case, by a linear contact of each individual bearing body from the inner ring to the outer ring of the roller body. In one exemplary arrangement, the running face of the outer ring, and also the running face of the inner ring on which the bearing bodies roll, are preferably of planar design, so that only a small contact pressure can occur between said components, and play is largely avoided.

Axial fixing of the bearing bodies in the intermediate space between the outer ring and the inner ring of the roller body takes place, for example, by the use of securing rings, which are flexible in diameter and which can be mounted in intended grooves in the outer ring and/or inner ring; or can be fixed by the use of collars which are integrally formed on the outer ring and/or inner ring and by means of which the bearing bodies can be fixed during the assembly of the outer ring and inner ring. In contrast to DE-A1-100 32 065, the inner ring of the roller body is, according to one aspect of the invention, of a closed (and in one particular arrangement, a single-part) design, such that the bearing bodies can roll on a continuous inner running face. In addition to the reduced loading of the bearing bodies, it is thereby also possible to realize a reduced number of parts for the roller bodies and for the joint, as a result of which the assuming effort and the production costs are reduced.

The inner ring of the roller body itself is additionally arranged on the respective journal in such a way that a rotation of the inner ring about the journal is prevented. This refers in particular to a rotation about the journal axis. A movement of the inner ring and therefore of the roller body on the journal is not restricted here, and the inner ring is therefore freely moveable on the journal in both directions along the journal axis, and the outer ring of the roller body is freely rotatable relative to the closed inner ring. The blockage/prevention of the rotation is generated in particular by the opposing journal outer faces and inner faces of the inner ring, which are formed so as to be at least partially form-fitting in the rotational direction about the journal; that is to say about the journal axis. In other words, that means, for example, that the journal has partial faces on its outer periphery, and/or the inner rings have partial faces on their inner periphery, which form undercuts with the opposing partial faces during rotation of the inner ring on the journal. In particular cases, the roller body can also have a plurality of closed inner rings which are, for example, of a disc-shaped design and adjoin one another. One exemplary embodiment is, however, (precisely) one closed and single-part inner ring.

The prevention of a (in particular free or unlimited) rotation of the inner ring relative to the journal now has the result that, for the operation of the joint, defined regions of the journal and of the inner ring can be assigned to one another, or always only said defined regions interact with one another. As a result of the blockage of the rotation of the inner ring relative to the respective journal, it is therefore possible to provide an application- and/or load-orientated design of the inner ring with regard to loading through force transmission. The corresponding design can relate here in particular to material, coating, shape and other mechanical and/or chemical properties of the journal/inner ring pairing. It is therefore possible, in particular for friction losses, lack of lubrication and therefore noise generation and service life, to be influenced in a targeted positive fashion.

According to a further embodiment of the tripod joint, it is provided that the journals have, in each case, two opposite force transmission faces, and the inner rings have, in each case two opposite ring force-absorbing faces which are arranged so as to be situated opposite the force transmission faces of the journal, and at least the force transmission faces or the ring force-absorbing faces are planar or flattened.

Here, the force transmission faces of the journal are the faces via which the main force is transmitted during the torque transmission of the tripod joint. Said faces are therefore arranged on the journal in the peripheral direction of the inner joint part and transmit the torques from the joint outer part to the joint inner part or vice versa.

The correspondingly designed faces on the inner ring of the roller body are referred to here as ring force-absorbing faces. Depending on the embodiment of the force transmission faces or of the ring force-absorbing faces, it is possible here to configure single-line or multi-line contact and/or (preferably) a real contact between the force transmission face and ring force-absorbing face, so that an adapted embodiment of the invention can be used depending on the loading case. The defined contact possibilities permit, if appropriate, cost-effective, local re-machining of the journal and/or inner ring in the region of said force transmission face or ring force-absorbing face.

The description "planar" and "flat" relates to the peripheral face of the journal or of the inner ring as viewed in the direction of the journal axis. A "planar" configuration can be recognized in particular in that straight peripheral sections are formed in several cross sections of the component perpendicular to the journal axis. Here, "flattened" also means, in other words, that the cross section through the component perpendicular to the journal axis is non-circular, with the peripheral region with the larger radius of curvature then forming the force transmission faces or the ring force-absorbing faces. It is, if appropriate, possible for the configuration of the periphery of force transmission faces or the ring force-absorbing faces perpendicularly with respect thereto, that is to say for the profile in the direction of the journal axis, to be designed independently of this. The force transmission faces (like the ring force-absorbing faces) make up in each case, preferably at least 10% of the entire periphery here, in particular between 10% and 20%.

In the case of a planar, that is to say, a particularly flat force transmission face, that is to say, a face with an infinite radius of curvature (wherein the usual tolerances should of course be permitted), the ring force-absorbing face can be formed according to a design from the following group: planar, as a flattened cone or as a flattened pyramid, with the elevation over the planar face being in each case convex, that is to say pointing away or outward from the respective face or from the body.

In the case of a flat, outwardly curved journal face, that is to say, convex design of the force transmission face, with it being possible for the curvature to be designed in the manner of a flattened cone and of a flattened pyramid, the annular force transmission face can be of planar design or designed as a flattened cone or as a flattened pyramid. The flattened designs of the ring force-absorbing faces are likewise convex here, that is to say, designed so as to point away or outward from the face or from the body.

According to a further embodiment of the invention of the tripod joint, the journals have control faces which are situated opposite one another in the direction of the second longitudinal axis and which are in each case convex. Here, the second longitudinal axis is in particular the central axis of the central body, or the central axis of the shaft, which is connected to the central body if the journal axes extend in each case radially with respect thereto. Accordingly, the control faces of the journal as specified here are those faces which, during use, transmit the axial movement or the axial forces between the outer joint part and inner joint part, and therefore move the roller bodies within the outer joint part along the recesses. Here, the control faces have in each case one convexly shaped face which is therefore curved outward as viewed from the journal. The convex control face can, for example, be shaped in the manner of a sphere segment or in the manner of a cylinder segment, with the orientation of the cylinder segment being such that it is orientated about a cylinder axis which runs transversely, therefore in particular perpendicularly, with respect to the journal axis, and transversely; therefore in particular perpendicularly, with respect to the central axis.

According to a further expedient embodiment of the tripod joint, the journals, in each case, have control faces and force transmission faces, and in each case, one transition face is provided between the control faces and the force transmission faces, which transition face connects the control face and the force transmission face to one another, with the transition face having at least one chamfer in the direction of the journal axis, which chamfer connects the transition face to a journal end face or to the central body.

The transition face specified here, as a result of the blocked position of the inner ring with respect to the journal, does not serve to transmit force between the journal and the inner ring of the tripod Joint. The transmission face here can therefore be of almost any desired design without restricting the freedom of movement of the inner ring when the inner ring moves on the journal. The transition face can, depending on the embodiment, extend from the journal projection on the central body to the journal end face, with a chamfer preferably being formed in particular at the transition to the journal end face, so that a collision of the transition face with the inner ring of the roller body during operation as a result of crossing of the inner ring with respect to the journal is avoided.

Here, the journal can extend for example proceeding from the journal end face in the direction of the journal projection over at least 10% of the axial length of the journal, if appropriate even over more than 20% or even at least 35% of the axial length of the journal.

According to a further embodiment of the tripod joint, the inner ring has two ring force-absorbing faces and two ring running faces, with the ring running faces being arranged so as to be situated opposite the control faces of the journal and being of planar or flattened design.

The ring running faces primarily serve, like the control faces of the journal, not for the force transmission within the joint, but rather for controlling the rolling bodies along the recesses in the outer joint part as a result of the axial forces which are transmitted between the outer joint part and inner joint part, with said axial forces being small in relation to the forces which act in the peripheral direction of the respective longitudinal axis of the outer joint part or of the inner joint part.

The connecting faces of the inner ring, which connecting faces connect the ring force-absorbing faces and the ring running faces, are also not to be designed for contact force transmission, but rather can be of almost any desired design taking into consideration the freedom of movement of the inner ring on the journal. The ring running faces of the inner ring are of planar design here, that is to say in each case in combination with for example a spherical or cylindrical control face of the journal with a cylinder axis aligned transversely (in particular perpendicularly) with respect to journal and longitudinal axes of the inner joint part—that is to say of different shape.

The ring running faces can also have a convex outer shape which is of cylinder-segment-shaped design with a cylinder axis aligned transversely (in particular, perpendicularly) with respect to the journal axis and the second longitudinal axis of the inner joint part, with it being possible for said design of the ring running face of the inner ring to be combined with a control face of the journal which has a convex sphere segment or a cylinder segment.

As a result of the small forces which are transmitted in the axial direction of the tripod joint, the control faces and ring running faces can otherwise also be of any desired shape, but should have a considerable degree of play with respect to one another here, so that a crossing or deflection of the roller unit with respect to the journal does not lead to a collision of the faces. This would represent a saving potential in particular in a particularly cost-effective embodiment.

According to a further particularly preferred embodiment of the tripod joint, the journals have, in each case, two opposite force transmission faces and the inner rings having, in each case, two opposite ring force-absorbing faces which are arranged so as to be situated opposite the force transmission faces of the journal, and the force transmission faces and the ring force-absorbing faces being planar, and also the outer ring of the roller body being pivotable in the recess in the peripheral direction of the central body.

Said embodiment results in a real contact between the journal and inner ring in the main force transmission direction, so that a relatively low contact pressure is obtained. The inner ring is, in this case, neither rotatable about the journal axis, nor is it pivotable about an axis parallel to the second longitudinal axis of the inner joint part. The inner ring with the roller body is moveable on the journal and pivotable about an axis which runs transversely/perpendicularly with respect to the journal axis and transversely/perpendicularly with, respect to the second longitudinal axis of the inner joint part.

In said embodiment, the angular compensation of the orbital movement takes place in the area of contact between the outer ring of the roller body and the recess of the outer joint part, so that the outer ring of the roller body has for example a spherical outer contour in its outer periphery, so that said roller body is pivotable about the central axis of the recess of the outer joint part or pivotable in the peripheral direction of the central body. Here, the recess in the outer joint part is of corresponding shape, so that the roller body is not fixed in the peripheral direction of the outer joint part but rather can be pivoted, corresponding to the orbital movement which is brought about, in a range from 0 to 5°, in particular from 0 to 3°, at both sides with respect to the track central axis of the recess. Said pivoting is referred to as the orbital angle. Here, the track central axis is the axis of each recess in the outer joint part along which the roller bodies can move as a result of the axial forces in the outer joint part.

Here, the angular compensation of the orbital movement can also take place at least partially between the tripod journal and the inner ring. For this purpose, however, at least either the force transmission faces of the journal or the ring force absorbing faces of the inner ring must be of convexly curved design. The convex shape of the respective face encompasses that the face is designed in the manner of a sphere segment, a barrel segment or a cylinder segment with a cylinder axis in the axial direction of the central body.

The roller body according to the invention, at which the invention is also aimed, is suitable for use in a tripod joint and in particular in a tripod joint according to the invention, and is designed with at least one outer ring, a closed inner ring and bearing bodies which are arranged in between, with the inner ring having a noncircular inner periphery. Here, the inner periphery is in other words in particular the innermost component line of any desired cross section which is aligned transversely/perpendicularly to the rotational axis of the roller body.

The inner periphery of the inner ring is accordingly not circular, but rather of elliptical shape and/or has discontinuous transitions and/or also projections, notches, punctiform elevations, cutouts or the like, so that a rotation with respect to a mandrel-like holding body, in particular a journal of a tripod joint according to the invention, which is provided for holding the inner ring, is restricted or can be prevented.

The inner periphery specified here comprises in any case that part of the inner ring which is in engagement with the mandrel or the journal when the inner ring is used, for example, in a tripod joint.

According to a further aspect of the invention, a roller body for a tripod joint is also proposed, such as, for example, for a tripod joint like described above, with the roller body having at least one outer ring, a closed inner ring and bearing bodies which are arranged in between, with the inner ring having an angular inner periphery.

Angular is intended here to mean that the shape of the inner periphery is not round and also not elliptical, but rather is preferably approximated to a polygon. The corners of the inner periphery can be rounded here. Here, the basic design of the inner periphery is however not round but polygonal; the inner ring has in particular a multiple of 4 corners, that is to say for example it is square or octagonal. Here, the corners delimit in particular functional faces of the inner ring and extend preferably over the entire axial length of the inner ring.

According to a further embodiment of the roller body, the inner ring has different functional faces which are arranged with, in each case, the same design opposite one another. Functional faces are intended here to mean faces which, depending on the application, must perform specific tasks or bear specific loads. Here, the functional faces are arranged with in each case identical design, that is to say identical specification and layout, opposite one another on the inner side of the inner ring, that is to say are inner faces of the inner ring. The different journal outer faces of a tripod joint, such as a tripod joint described above, are also meant here by functional faces.

According to another embodiment, the functional faces can extend on the already-defined force transmission faces, ring force-absorbing faces, control faces, ring running faces, transition faces, connecting faces and chamfers, or else can encompass only partial regions of said faces.

In particular, the annular force transmission faces are of reinforced design or are provided with a particular coating or hardening for example with respect to a high contact pressure, so that improved operation is possible with for example relatively low lubricant quantities or else relatively low friction and therefore relatively low noise generation. Regions of the inner ring which are not loaded or are loaded to a lesser extent can also, according to an embodiment, be of more elastic design than other regions, so that deformations of the inner ring are possible in regions provided for this purpose.

According to a further embodiment of the roller body, the functional faces have in each case different face sizes. That is to say that the particularly adapted partial regions of the inner ring or of the journal do not extend over the entire area of the force transmission face, ring force-absorbing face, control face, ring running face, connecting face, transition face or chamfer, but rather comprise only one partial region of at least one of said areas. In addition, the inner periphery is preferably not divided into uniform sections by the different functional faces, though this is not strictly necessary.

According to a further embodiment of the roller body, partial regions of the inner ring have different mechanical properties. This can be obtained in particular by means of different hardening processes or hardness grades of the material, by means of the material composition and/or by means of at least one coating. Said embodiment is also not restricted to the inner ring, but can likewise be provided for the individual journals.

According to another embodiment, the roller body is used in a tripod joint and in particular in a tripod joint according to the invention.

The embodiments of tripod joints listed here permit, during use, a deflection of the inner joint part relative to the outer joint part, that is to say of the second longitudinal axis with respect to the first longitudinal axis, up to at least 30°, in particular of up to 32° or up to 36°. Said deflection is referred to as a deflection angle.

Additionally, a motor vehicle having at least one tripod joint according to the disclosure is also contemplated.

Some geometric sizes and relations are specified below with regard to the embodiment of a tripod joint of said type, though the invention is not restricted to said sizes and relations, with the individual values being specified in relation to the pitch circle diameter PCD with the exception of the deflection angle β (beta) and the orbital angle α (alpha) which are each specified as absolute values. The geometries considered result also from the following explanations of FIGS. 17 to 22 and also from the figures themselves. The specified values represent, in each case, lower and upper limits of the individual geometric variables or relations:

| | |
|---|---|
| $0.5 \leq PCD/D1 \leq 0.7$ | D1: Outer joint body outer diameter |
| $1.0 \leq PCD/D2 \leq 1.3$ | D2: Breadth of guide tracks |
| $1.0 \leq PCD/D3 \leq 1.3$ | D3: Roller body outer diameter |
| $1.5 \leq PCD/D4 \leq 2.0$ | D4: Inner ring outer diameter |
| $2.0 \leq PCD/D5 \leq 2.7$ | D5: Ring running face breadth |
| $2.8 \leq PCD/D6 \leq 3.7$ | D6: Roller body width |
| $4.4 \leq PCD/D7 \leq 6.0$ | D7: Inner ring width |
| $1.1 \leq PCD/D8 \leq 1.4$ | D8: Central body outer diameter |
| $1.6 \leq PCD/D9 \leq 2.2$ | D9: Central body inner diameter |
| $2.2 \leq PCD/D10 \leq 3.0$ | D10: Force transmission face breadth |
| $2.0 \leq PCD/D11 \leq 2.7$ | D11: Control face breadth |
| $2.0 \leq PCD/D12 \leq 2.7$ | D12: Central body width |
| $4.4 \leq PCD/D13 \leq 6.0$ | D13: Inner ring width |
| $2.2 \leq PCD/D14 \leq 3.0$ | D14: Ring force absorbing face breadth |
| $1.6 \leq PCD/D15 \leq 2.2$ | D15: Shaft diameter |
| $0.4 \leq PCD/D16 \leq 12$ | D16: Ring force absorbing face radius |
| $0° \leq \alpha$ (alpha) $\leq 5°$ | Orbital angle |
| $0° \leq \beta$ (beta) $\leq 36°$ | Deflection angle |

BRIEF DESCRIPTION OF THE DRAWINGS

The disclosure and the technical field are explained in more detail below on the basis of the figures. It is to be pointed out that the figures show various embodiments of the invention, to which the invention is however not restricted. In the figures, in each case schematically.

DETAILED DESCRIPTION

Figure 1:
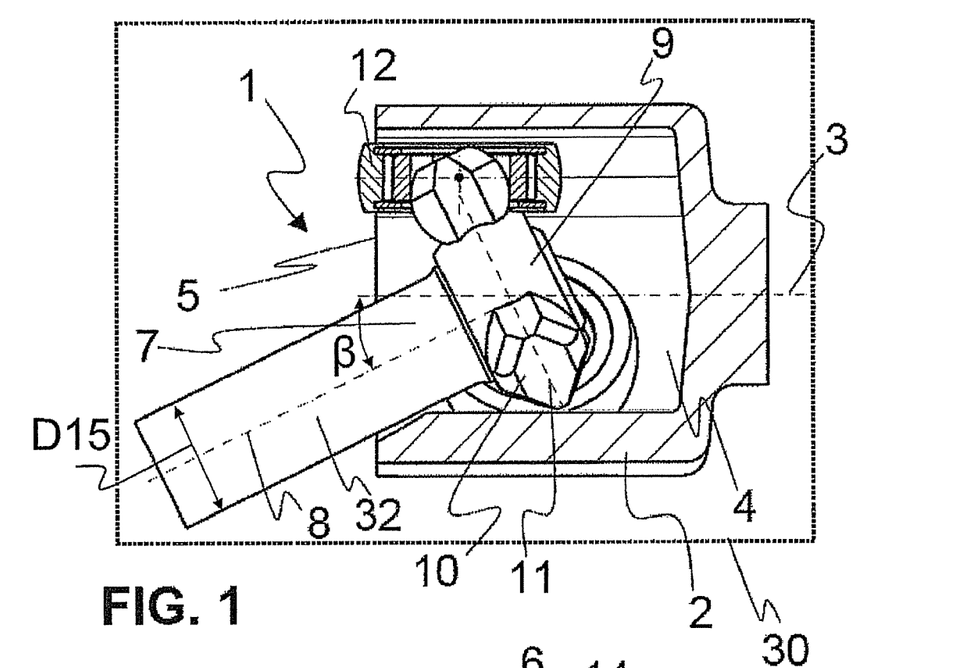
FIG. 1 shows a side view of a cross section through a tripod joint.

FIG. 1 illustrates an embodiment of a tripod joint 1 according to an embodiment of the invention in a motor vehicle 30, with the outer joint part 2 having a first longitudinal axis 3 and an open end 5, through which extends an inner joint part 7 with a central body 9 and with a shaft 32 which is connected to said central body 9, into the cavity 4 of the outer joint part 2. The shaft 32, with a shaft diameter D15, and the central body 9 have here a common second longitudinal axis 8. Three journals 10 are integrally formed on the central body 9, which journals 10 are arranged along journal axes 11 which radially extend from the second longitudinal axis 8. Roller bodies 12 are arranged on the journals 10 in such a way that a crossing or deflection of the inner joint part 7 with the second longitudinal axis 8 with respect to the outer joint part 2 with the first longitudinal axis 3 is permitted about a deflection angle beta (β). In the various embodiments according to the invention, a deflection of said type is possible with a deflection angle beta (β) of up to 36°.

Figure 2:
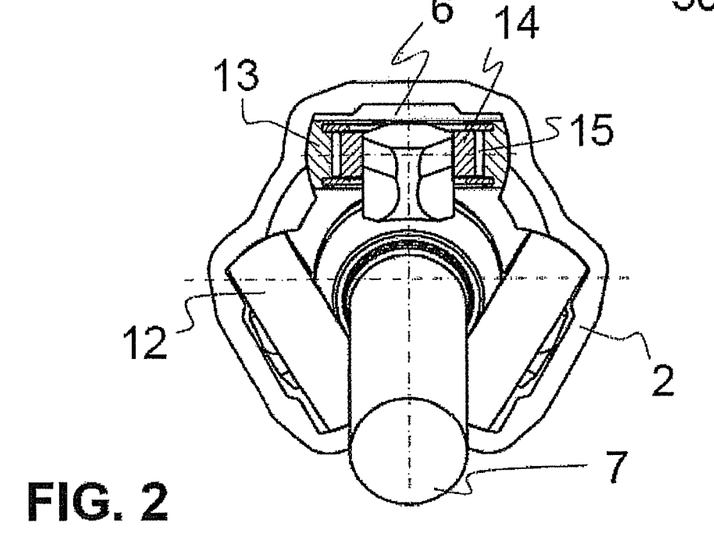
FIG. 2 shows a plan view of a tripod joint along the first longitudinal axis.

FIG. 2 shows an outer joint part 2 with radial recesses 6 within which roller bodies 12 move axially in the direction of the first longitudinal axis 3. The inner joint part 7 is guided within the outer joint part 2 in the axial direction along the first longitudinal axis 3. The roller bodies 12 each have at least an outer ring 13, an inner ring 14 and bearing bodies 15 arranged in between.

Figure 3:
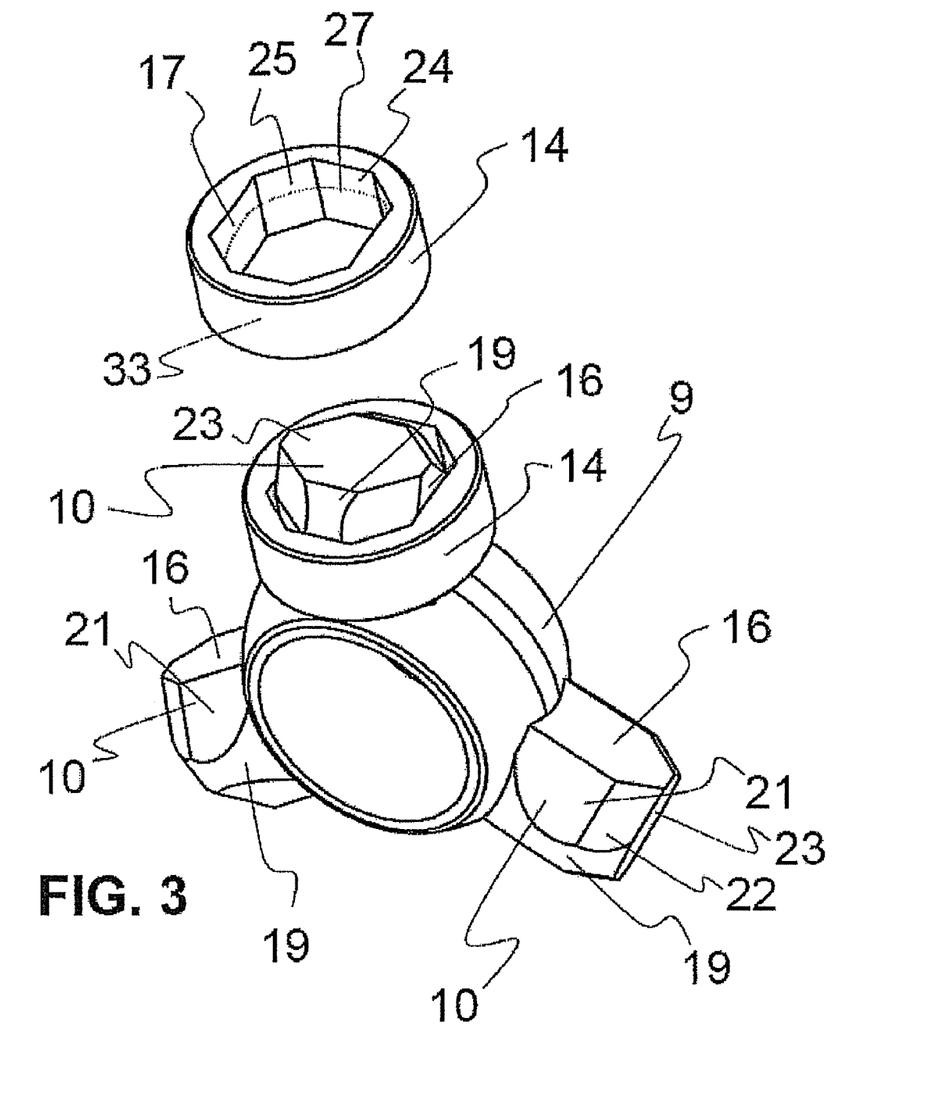
FIG. 3 shows a perspective illustration of a central body of a tripod joint, with an inner ring additionally illustrated in an exploded fashion.

The inner ring 14 has a round outer shape and is, as shown in FIG. 3, according to one particular exemplary embodiment, of angular design on its inner periphery 27. Here, the ring force-absorbing face 17, the ring running face 24 and connecting face 25 are formed in each case opposite one another on the inner side of the inner ring 14. The inner ring 14 is arranged on the respective journal 10 of the central body 9 in such a way that the ring force-absorbing faces 17 are arranged opposite the force transmission faces 16 of the journal 10, so that the ring running faces 24 are also arranged opposite the control faces 19 of the journal 10. The main force transmission when the tripod joint 1 is in use takes place here via the annular force transmission face 17 and the force transmission face 16, that is to say in the peripheral direction of the central body 9.

The journals 10, which are integrally formed on the central body 9, also have, in addition to the force transmission faces 16 and the control faces 19, transition faces 21 and chamfers 22, with the chamfers 22 connecting the transition faces 21 to the journal end face 23.

According to one exemplary embodiment of the inner ring 14, the latter can be of flattened design on the inner ring outer periphery 33, so that the inner ring outer periphery 33 of the inner ring 14 assumes an elliptical shape in a cross section transversely with respect to the journal axis 11, with the greatest radii being arranged here so as to be situated opposite the ring force-absorbing faces 17, so that the lowest possible contact pressure is obtained between the bearing bodies 15 and inner ring 14 or inner ring outer periphery 33.

Figures 4, 5:
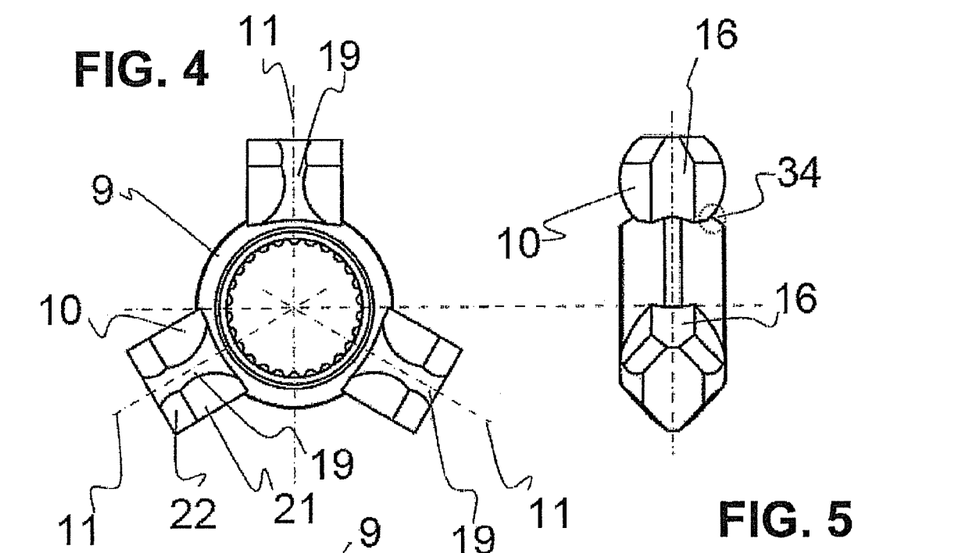
FIG. 4 shows the view of a central body along the second longitudinal axis.
FIG. 5 shows a first side view of the central body of FIG. 4.
Figure 6:
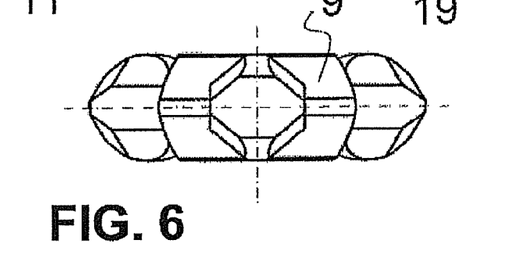
FIG. 6 shows a second side view of the central body of FIG. 4.

FIGS. 4 to 6 show, in individual views, a central body 9 having journal axes 11 which extend radially from the second longitudinal axis 8, in a plan view (FIG. 4) and in side views (FIGS. 5 and 6). In the direction of the second longitudinal axis 8, the journals 10 have control faces 19 which are of spherical design here, as can be seen in the side views. Here, the undercut 34 (FIG. 5) is formed at the transition of the journal 10 to the central body 9 in the region of the control faces 19 and the transition faces 21, so that in the event of an intense deflection of the inner joint part 7 with respect to the outer joint part 2, a collision of the inner ring 14 with the central body 9 is avoided. The chamfers 22 of the journal 10 are also of corresponding design, so that a collision of the journal 10 with the inner ring 14 at large deflection angles can be avoided.

Here, the force transmission faces 16 are, according to one exemplary embodiment, of planar design.

Figure 7:
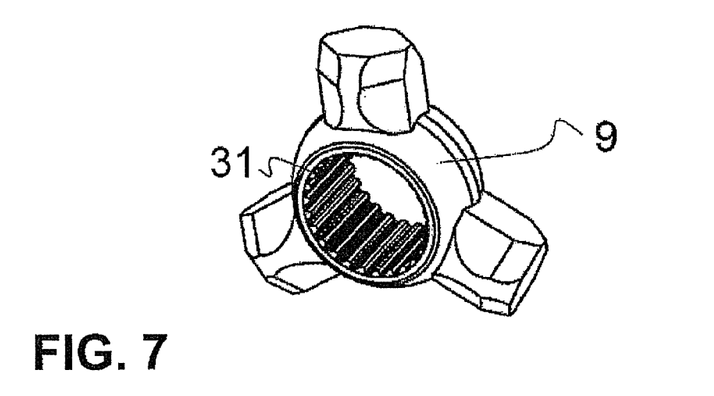
FIG. 7 shows a perspective illustration of a central body.

The connection between the central body 9 and shaft 32 is obtained, as shown in FIG. 7, by the use of a spline toothing 31 which is formed both on the shaft 32 (not shown here, but see FIGS. 1 and 2) and also in the central body 9.

Figure 8:
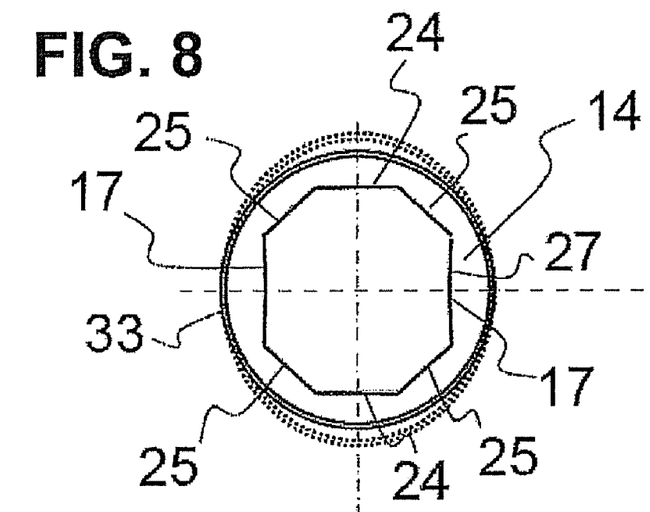
FIG. 8 shows a plan view of an inner ring.
Figure 9:
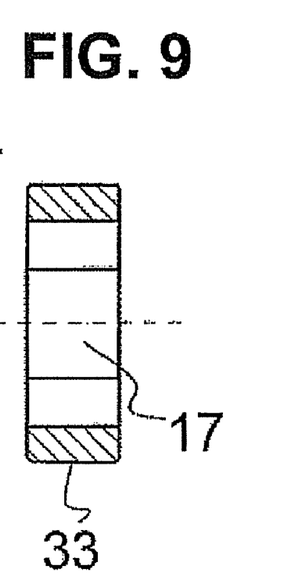
FIG. 9 shows a first side view of the inner ring of FIG. 8.
Figure 10:
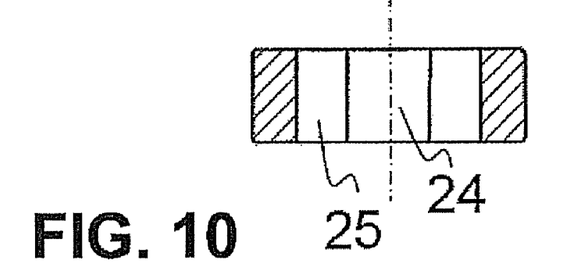
FIG. 10 shows a second side view of the inner ring of FIG. 8.

The inner ring 14 is illustrated again in FIGS. 8 to 10 in a plan view (FIG. 8) and in its side views (FIGS. 9, 10). It is clear here that the functional faces 28, that is to say here the ring force-absorbing face 17, the ring running face 24 and the connecting faces 25, are arranged so as to be situated opposite one another. The inner periphery 27 of the inner ring 14 is of angular design here.

As already described, the inner ring outer periphery 33 can also be of slightly elliptical design (indicated here in FIG. 8 with a dashed line, illustration not to scale), since the position of the inner ring 14 on the journal 10 is predefined by the non-rotationally-symmetrical inner contour of the inner ring 14, and therefore the direction of the force introduction from the inner joint part 7 to the outer joint part 2 is predefined by the force transmission faces 16 and ring force-absorbing faces 17 of the journal 10 and of the inner ring 14. As a result of the elliptical design of the inner ring outer periphery 33, it is possible to obtain the lowest possible contact pressure between the inner ring outer periphery 33 and bearing bodies 15 by positioning the region of the inner ring 14 with the greatest radius in the inner ring outer periphery 33 in the peripheral direction of the central body 9, that is to say so as to be situated opposite the ring force-absorbing faces 17. The load is distributed between a greater number of bearing bodies 15, and this leads to a more 10 uniform load distribution between the bearing bodies 15, as a result of which the service life of the bearing bodies 15 is increased, and if appropriate also the individual, now less-loaded components can be designed to be smaller, so that the entire unit can be of more compact design.

Figure 11:
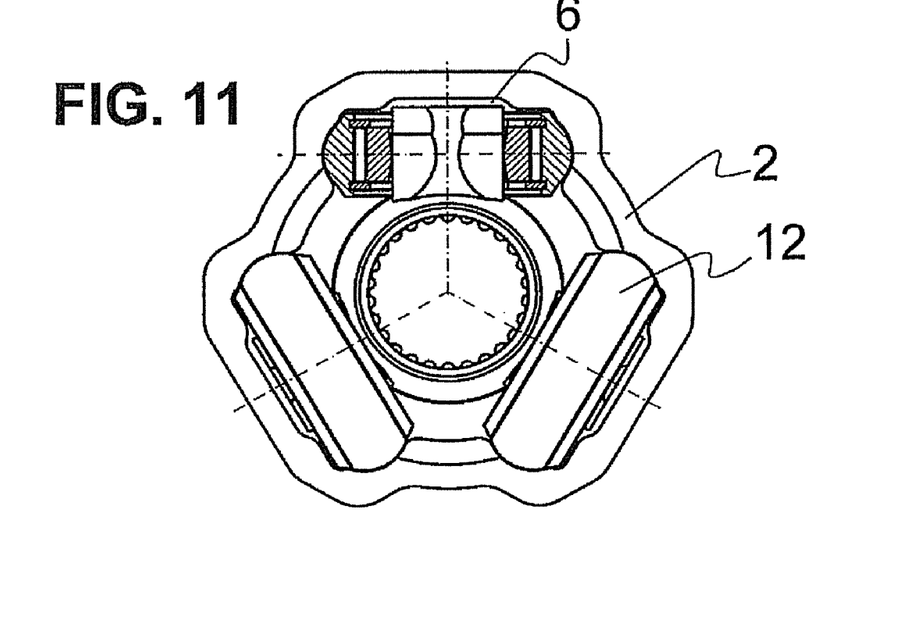
FIG. 11 shows a further plan view of a tripod joint along the first longitudinal axis.
Figure 12:
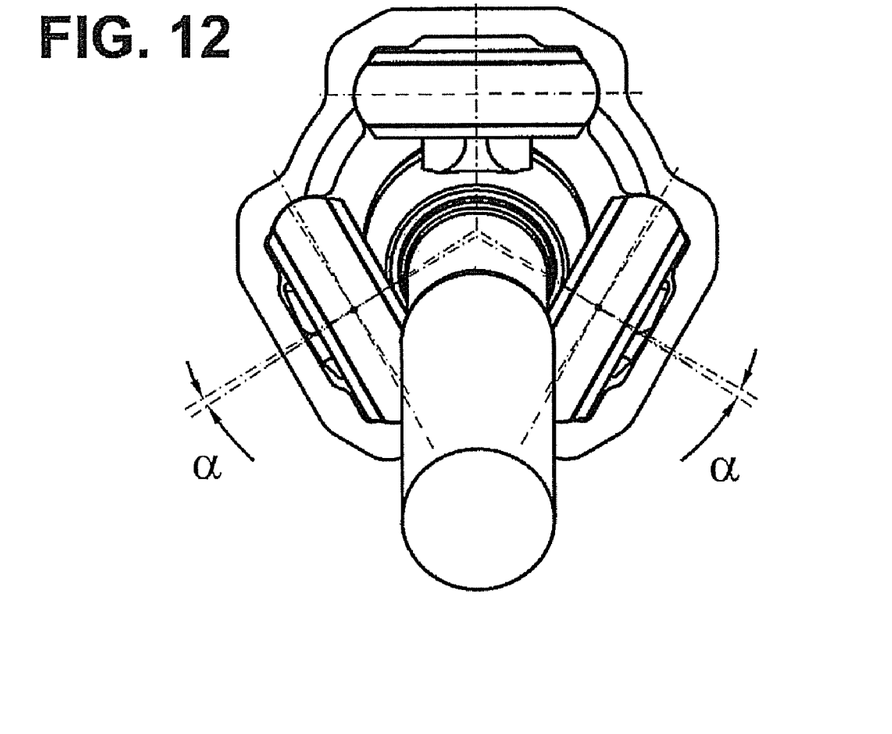
FIG. 12 shows a plan view of a deflected tripod joint and tilting of the journal in the inner ring.
Figure 13:
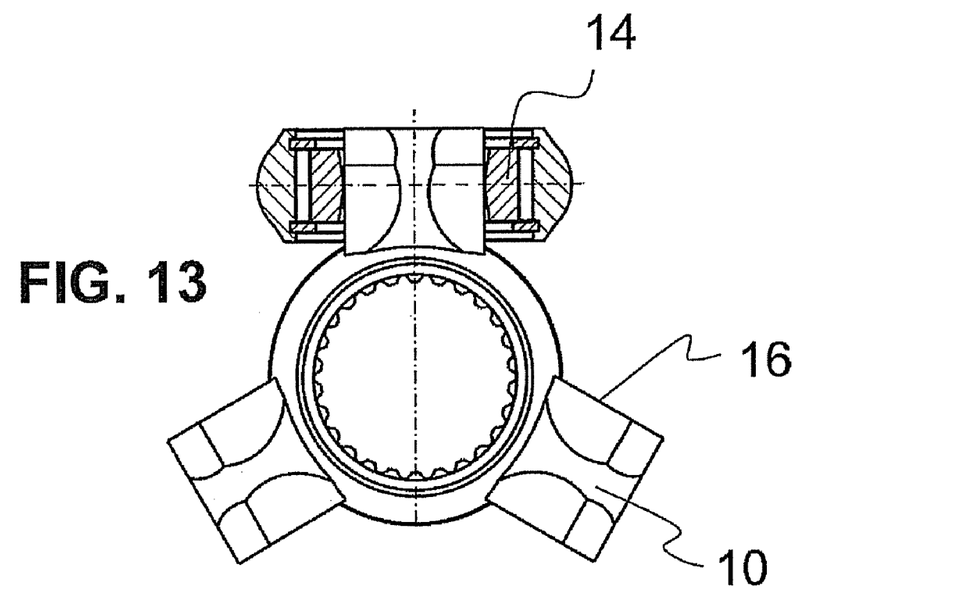
FIG. 13 shows a view of a central body along the second longitudinal axis without tilting about the orbital angle.

FIGS. 11 and 12 show an outer joint part 2 with radial recesses 6 within which roller bodies 12 move axially in the direction of the first longitudinal axis 3. Here, the outer rings 13 of the roller bodies 12 are shaped such that a tilting movement within the recesses 6 about an orbital angle alpha ($\alpha$) is not possible here. Said tilting movement as a result of the detection of the inner joint part 7 with respect to the first longitudinal axis 3 about a deflection angle beta ($\beta$) is permitted in this variant only between the journal 10 and the inner ring 14.

Said tilting movement about the orbital angle alpha ($\alpha$) can take place between the inner ring 14 and journal 10 only when, as illustrated in FIGS. 13 to 16, at least the ring force-absorbing faces 17 of the inner ring 14 are of convexly curved design with an ring force-absorbing face radius D16, and when the force transmission faces 16 of the journal 10 are of planar design. At the same time or instead of the ring force-absorbing faces 14, the force transmission faces 16 of the journal 10 can also be of convexly curved design. The convex shape of the respective face encompasses that the face is designed in the manner of a sphere segment, a barrel segment or a cylinder segment with a cylinder axis in the direction of the second longitudinal axis 8 of the central body 9.

Figure 14:
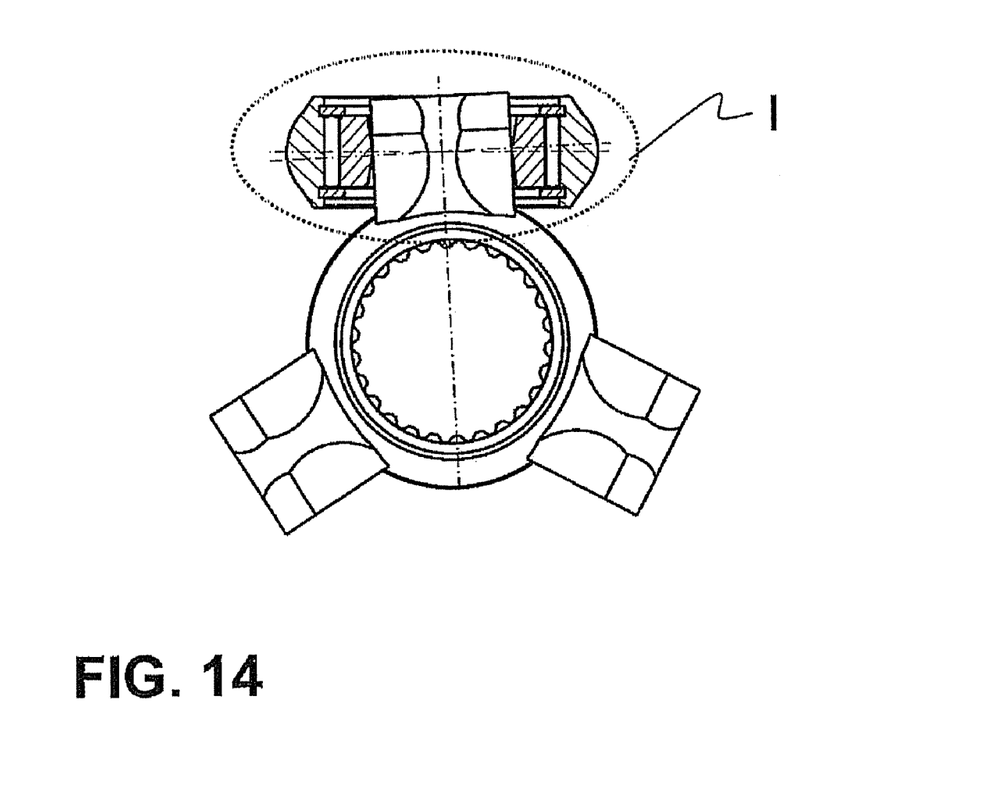
FIG. 14 shows a view of a central body along the second axis with tilting about the orbital angle and detail I.
Figure 15:
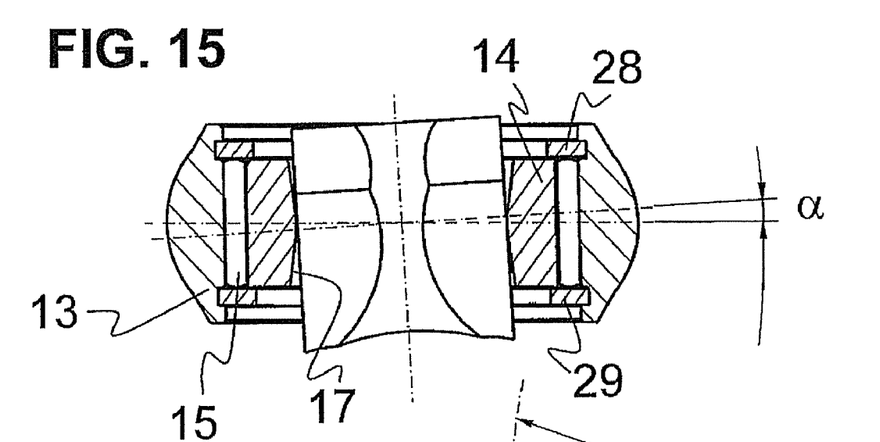
FIG. 15 shows an enlarged detail I from FIG. 14.
Figure 16:
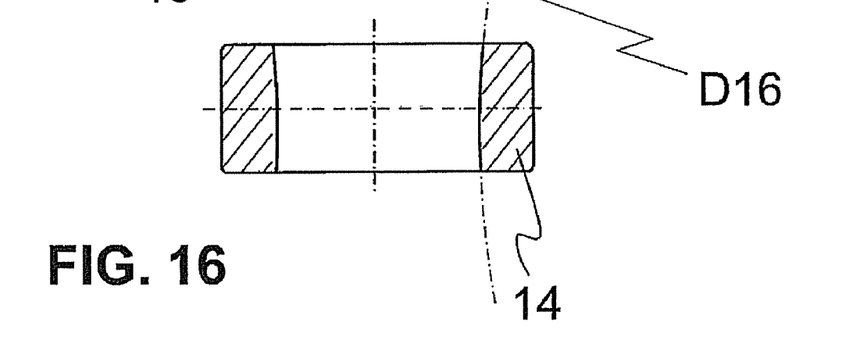
FIG. 16 show a further detailed view of the inner ring shown in FIG. 15.

FIG. 15 shows the enlarged detail I from FIG. 14, with it being possible to see the fixing of the bearing bodies 15 and of the inner ring 14 in the outer ring 13 by a first securing ring 28 and a second securing ring 29.

Figures 17, 18:
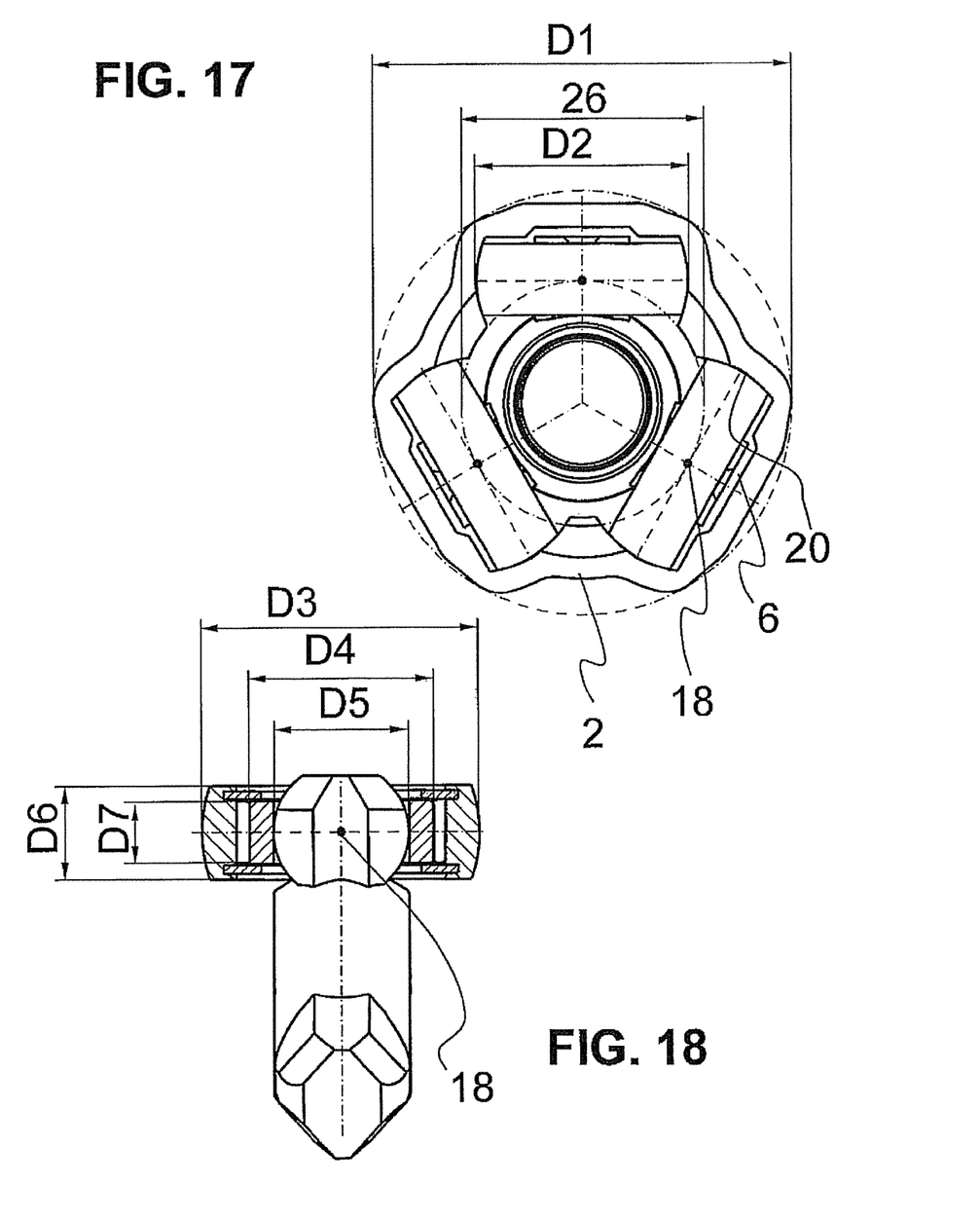
FIG. 17 shows a plan view of a tripod joint along the first longitudinal axis.
FIG. 18 shows a side view of a central body with rolling body.
Figures 19, 20, 21:
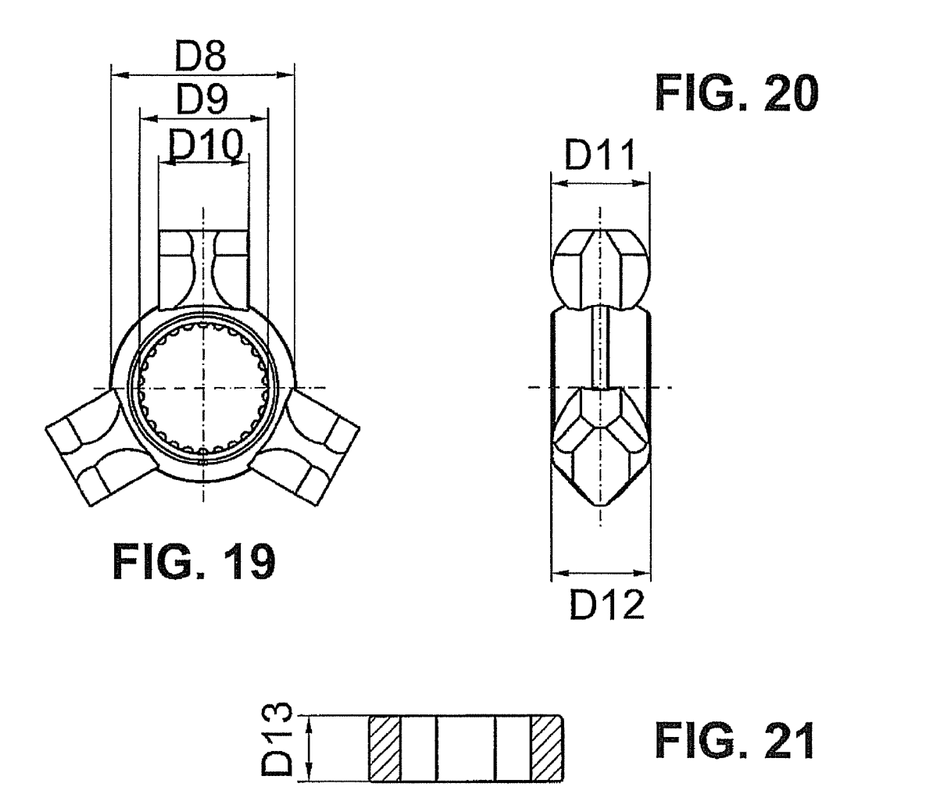
FIG. 19 shows a view of the central body of FIG. 18 along a longitudinal axis.
FIG. 20 shows a side view of the central body of FIG. 18 removed from the roller body.
FIG. 21 illustrates a side view of an inner ring of FIGS. 17.
Figure 22:
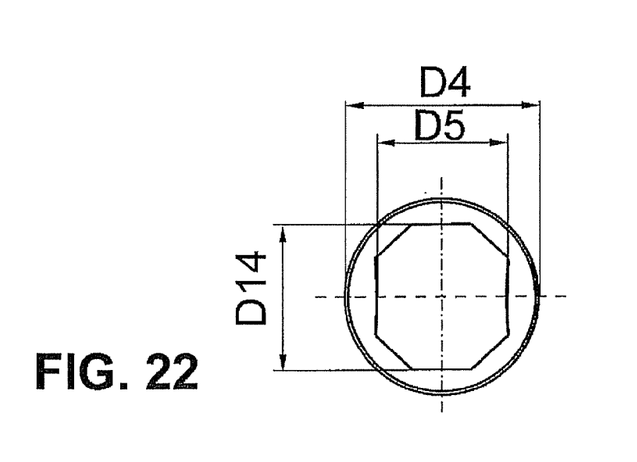
FIG. 22 illustrates a plan view of the inner ring of FIG. 21.

FIGS. 17 to 22 list once again the further geometric variables of a tripod joint 1 according to various embodiments of the invention. Here, in FIG. 17, D1 denotes the outer joint body outer diameter, D2 denotes the breadth of the guide tracks 20 within the recesses 6 of the outer joint part 2, and PCD denotes the pitch circle diameter 26 which specifies the diameter at which the roller body central points 18 are arranged. FIG. 18 specifies the geometric variables of the roller body 12, with D3 specifying the roller body outer diameter, D4 the inner ring outer diameter, D5 the ring running face breadth, D6 the roller body width and D7 the inner ring width. FIG. 19 shows the central body outer diameter D8, the central body inner diameter D9 and the force transmission face breadth D10. FIG. 20 shows the control face breadth D11 of the journal 10 and the central body width D12. FIGS. 21 and 22 show the inner ring width D13, the inner ring outer diameter D4, the ring running face breadth D5 and the ring force-absorbing face breadth D14.

The present invention is not restricted to the illustrated exemplary embodiments. Numerous modifications to the invention within the scope of the patent claims are in fact possible.

The invention claimed is:

1. Tripod joint having an outer joint part with a first longitudinal axis and a longitudinally running cavity with an open end, with three longitudinally running recesses being formed in the outer joint part, and having an inner joint part with a second longitudinal axis, comprising:
   at least one central body on which three journals are integrally formed with journal axes which extend radially from the second longitudinal axis, within each case one roller body being arranged on the journals,
   wherein the roller body has at least one outer ring, a closed inner ring and bearing bodies which are arranged in between; wherein the inner ring has two ring force-absorbing faces and two ring running faces, with the ring running faces being arranged so as to be situated opposite control faces of the journal and wherein the ring running faces have one of a planar and flattened design; with each roller body additionally being, in each case, held in the recesses in a longitudinally moveable manner, and a rotation of the closed inner ring about the respective journal being blocked; and
   wherein the journals have, two opposite force transmission faces, and at least one force transmission face that is one of planar or flattened, and wherein the force transmission faces are arranged on the journal in a peripheral direction of the joint inner part.

2. Tripod joint according to claim 1, wherein the inner rings have in each case two opposite ring force-absorbing faces which are arranged so as to be situated opposite the force transmission faces of the journal, and wherein at least one of the ring force-absorbing faces is one of planar and flattened.

3. Tripod joint according to claim 1, with the journals having opposite control faces which point in the direction of the second longitudinal axis and which are, in each case, convex.

4. Tripod joint according to claim 1, with the journals, in each case, having control faces and one transition face being provided between the control faces and the force transmission faces, the transition face connecting the control face and the force transmission face to one another, with the transition face having at least one chamfer in the direction of the journal axis, the chamfer connecting the transition face to one of a journal end face and the central body.

5. Tripod joint according to claim 1, wherein the outer ring of the roller body is pivotable in the recess in the peripheral direction of the central body.

6. Tripod joint having an outer joint part with a first longitudinal axis and a longitudinally running cavity with an open end, with three longitudinally running recesses being formed in the outer joint part, and having an inner joint part with a second longitudinal axis, comprising:
   at least one central body on which three journals are integrally formed with journal axes which extend radially from the second longitudinal axis, within each case one roller body being arranged on the journals,
   wherein the roller body has at least one outer ring, a closed inner ring and bearing bodies which are arranged in between; wherein the inner ring has a pair of ring force-absorbing faces, a pair of ring running faces and pairs of connecting faces, wherein a connecting face is arranged between a ring force-absorbing face and a ring running face such that the inner ring has a non-circular inner periphery; with each roller body additionally being, in each case, held in the recesses in a longitudinally moveable manner, and a rotation of the closed inner ring about the respective journal being blocked; and
   wherein the journals have, two opposite force transmission faces, and at least one force transmission face that is one of planar or flattened, and wherein the force transmission faces are arranged on the journal in a peripheral direction of the joint inner part.

7. Tripod joint according to claim 1, further comprising a pair of control faces and chamfers, wherein the control faces are separated from the force transmission faces by a transition face, and wherein the chamfers connect the transition faces to an end face of the journal.

* * * * *